July 16, 1929.                C. B. PARSONS                1,720,921
CONTROL MECHANISM FOR WINDSHIELDS
Filed Dec. 21, 1925
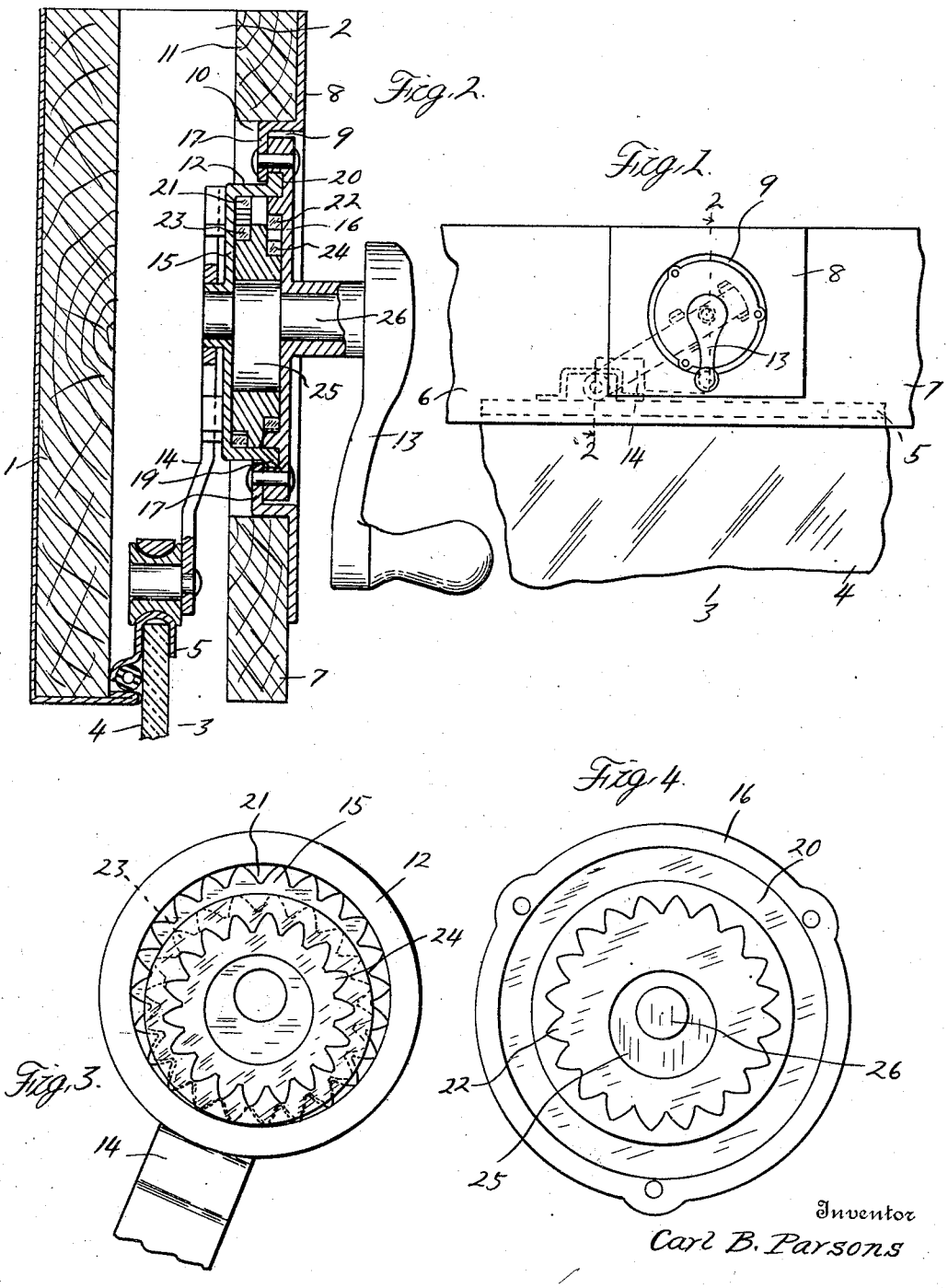
Inventor
Carl B. Parsons
Attorneys Patented July 16, 1929.

1,720,921

UNITED STATES PATENT OFFICE.

CARL B. PARSONS, OF DETROIT, MICHIGAN, ASSIGNOR TO MOTOR PRODUCTS CORPORATION, OF DETROIT, MICHIGAN, A CORPORATION OF NEW YORK.

CONTROL MECHANISM FOR WINDSHIELDS.

Application filed December 21, 1925. Serial No. 76,813.

This invention relates generally to windshield control mechanisms and consists of certain novel features of construction, combinations and arrangements of parts as will be more fully described and particularly pointed out in the appended claims.

In the accompanying drawing:

Figure 1 is a fragmentary rear elevation of a windshield construction embodying my invention;

Figure 2 is a vertical sectional view taken on the line 2—2 of Figure 1;

Figure 3 is an enlarged view of the cup-shaped section of the casing with the composite gear in position;

Figure 4 is an enlarged view of the cover section of the casing with the cam and shaft therefor applied.

Referring now to the drawing, the numeral 1 designates a header of a vehicle body of the closed type, having a vertical slot 2 for receiving a suitable windshield 3. As shown, this windshield comprises the glass panel 4 and the metal frame 5 and is adapted to slide vertically in suitable runways 6 in the upright members or pillars 7 of the vehicle body.

Secured to the rear face of the header 1 is a plate 8 having a cup-shaped depression 9 disposed in an opening 10 in the rear wall 11 of the header. Supported by this depressed portion 9 within the opening 10 is a casing 12 containing planetary gearing that is adapted to be operated by a suitable handle 13 upon the inside of the vehicle body for actuating an arm 14 operatively connected to the windshield 3. As shown, the casing 12 is circular in form and comprises the cup-shaped section 15 and the substantially flat cover section 16. The section 15 extends freely through the base 17 of the depressed portion 9 and is provided at its open end in rear of the base 17 with a peripheral flange 19 that rotatably engages a suitable groove 20 in the cover section 16, while the latter is received in the depression 9 and is rigidly secured to the base 17 thereof. The gearing in the casing preferably comprises the concentric internal gears 21 and 22 and the concentric external gears 23 and 24. As shown, the internal gear 21 is formed integral with the cup-shaped section 15 and the internal gear 22 is formed integral with the cover section 16, while the external gears 23 and 24 are integrally united and are eccentrically mounted with respect to the internal gears 21 and 22.

To provide an efficient construction the external gears 23 and 24 have a smaller number of teeth than the internal gears 21 and 22 and are held in mesh at all times with the respective internal gears 21 and 22 by means of a cam 25 fixed upon the handle shaft 26. With this arrangement the control mechanism for the windshield is inherently of the self-locking type so that the windshield is automatically held in any adjusted position.

Thus from the foregoing description, it will be apparent that the teeth of the external gears 23 and 24 will be brought successively into engagement with the teeth of the respective internal gears 21 and 22 when the cam 25 is rotated by the handle shaft 26. As a result the cup-shaped section 15 will be rotated relative to the fixed cover section 16 and will cause the arm 14 to raise or lower the windshield 3.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In a vehicle body, the combination with a windshield, and a header having a recess for receiving said windshield, of control mechanism for the windshield, including planetary gearing, a casing for the gearing mounted in the header having one section movable by a part of the gearing, and an operating connection between the movable section of the casing and said windshield.

2. In a vehicle body, the combination with a windshield, and a header having a recess for receiving said windshield, of control mechanism for the windshield, including planetary gearing, a casing for the gearing having a movable section adapted to be actuated by a part of said gearing, and an arm fixed to said movable section operatively connected to the windshield.

3. In a vehicle body, the combination with a header having an opening therein, of a plate secured to the header having a depressed portion disposed in the opening, and a windshield control mechanism carried by the depressed portion of said plate.

4. In a vehicle body, the combination with a header having a recess for receiving a windshield, of a plate secured to the header, and control mechanism carried by the plate including an arm operatively connected to the windshield, and planetary gearing for actuating the arm.

5. In a vehicle body, the combination with a header, of a plate secured to the header, and windshield control mechanism including a casing having a section fixed to said plate, and a cooperating flanged section rotatably mounted in the first-mentioned section in rear of a portion of said plate.

6. In a windshield control mechanism, the combination with a casing having a stationary section and a movable section, of planetary gearing including internal gears fixed to the respective sections of the casing, external gears meshing with the respective internal gears, and means for moving the external gears through an orbit to bring the teeth thereof successively into engagement with the teeth of the internal gears so as to actuate the movable section of said casing.

7. The combination with a movable windshield, of control mechanism therefor including a casing having a stationary section and a movable section, planetary gearing including internal gears fixed to the respective sections of the casing, external gears meshing with the respective internal gears, an arm fixed to the movable section and operatively connected to the windshield, and a rotary cam for moving the external gears through an orbit to bring the teeth thereof successively into engagement with the teeth of the internal gears so as to actuate the movable section and arm aforesaid.

In testimony whereof I affix my signature.

CARL B. PARSONS.